Oct. 6, 1953  R. IRVING  2,654,820
ELECTRIC IMMERSION HEATER
Filed May 26, 1950  2 Sheets-Sheet 1
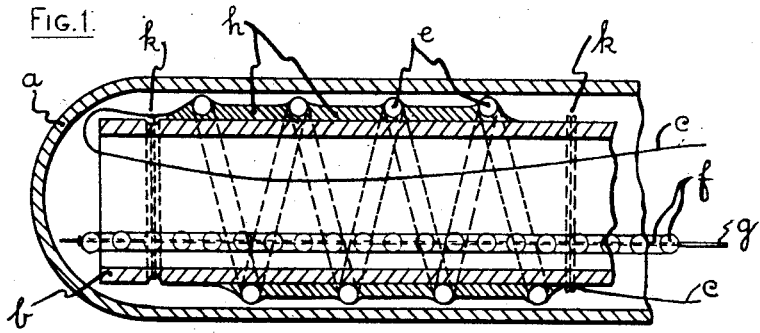
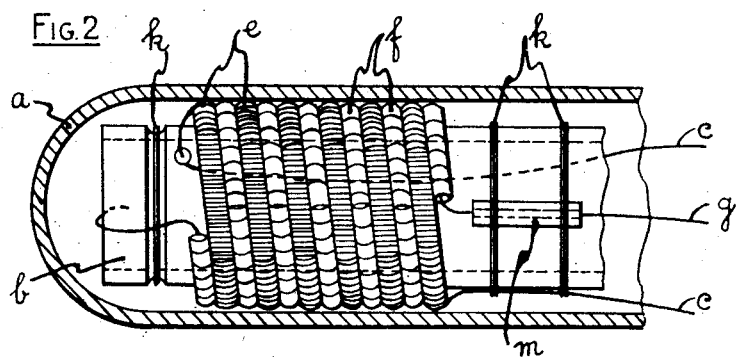
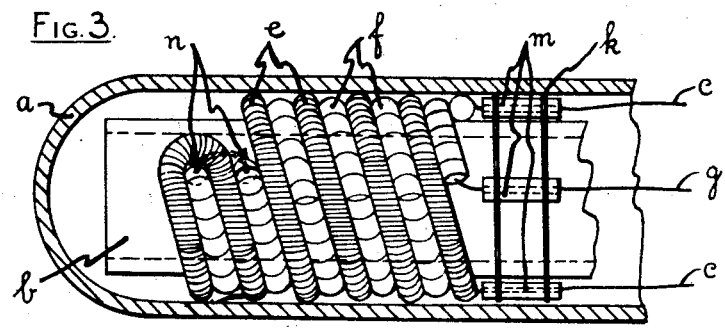

Oct. 6, 1953        R. IRVING        2,654,820
ELECTRIC IMMERSION HEATER
Filed May 26, 1950        2 Sheets-Sheet 2
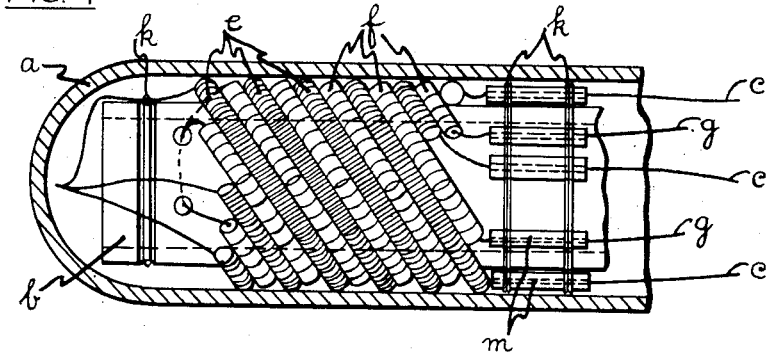
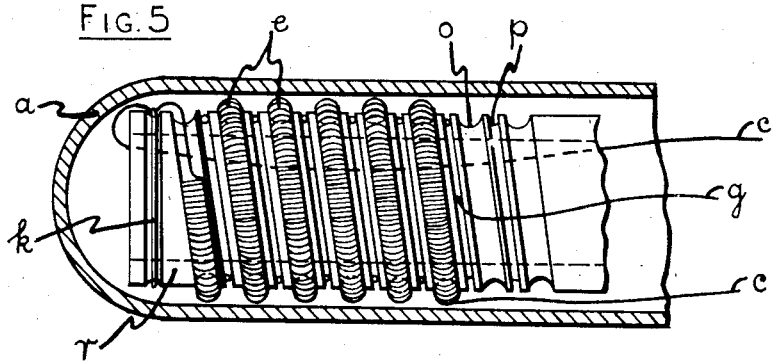
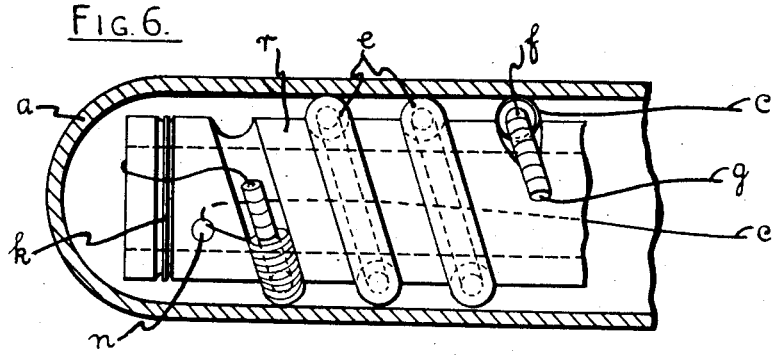

Patented Oct. 6, 1953

2,654,820

UNITED STATES PATENT OFFICE 2,654,820

ELECTRIC IMMERSION HEATER

Robert Irving, Newcastle-on-Tyne, England, assignor to The Thermal Syndicate Limited, Wallsend, England, a British company Application May 26, 1950, Serial No. 164,386
In Great Britain June 8, 1949

16 Claims. (Cl. 201—67)

This invention relates to improvements in the construction of electric immersion heaters incorporating closed end outer tubes of refractory, vitreous or refractory- or vitreous-covered, or synthetic plastic materials which when immersed in acids or other corrosive fluids withstand the action thereof and also have a high dielectric value providing adequate electrical insulation.

In particular, fused silica tubes have been used for this purpose, the construction following orthodox lines, wherein the wire heating element is wound in plain spiral or coiled form round an inner former of silica or other refractory material and the whole enclosed in an outer tube with one end closed, suitable sealing at the open end being provided by the use of cements or rubber or plastic. In such cases suitable wiring systems are used to connect the type of electricity supply available, but in these designs no internal earth wire system has hitherto been incorporated in the heaters as a protection in the event of rupture of the insulating outer tube whilst immersed in use.

It is desirable to wind the element spiral of wire round the inner former with even spacing and also to prevent creep of the element during the heating cycle while providing a positive form of insulation between individual turns of the spiral. For this purpose screwed or grooved inner formers of refractory material have been employed, whilst in other assemblies patches of suitable cement have been used to anchor the coils at local points or completely encase the element throughout the heating spiral.

The object of the present invention is to provide in an immersion heater a safety internal earth wire system fully protected from damage or corrosion under conditions where the provision of an extraneous earthing system would be difficult, expensive or practically impossible or undesirable, and at the same time arrive at a simple design capable of easy assembly and renewal of the internal wiring arrangements without the use of specially shaped formers, which are replaced by standard materials readily available at minimum cost.

According to the present invention an electric immersion heater of the kind comprising an outer closed-end tube, for example of refractory, vitreous, refractory-covered, vitreous-covered or synthetic plastic material, which is of high dielectric value, within which is provided a plain or coiled heating element, preferably wound on a solid or tubular inner former, is also provided with an earth wire within the outer tube.

For example a spiral groove may be provided in the outer surface of the inner former, said groove being arranged between the windings of the heating element thereon, and the earth wire may be housed within said groove.

It is preferred to thread refractory insulating beads on the earth wire and to wind the beaded earth wire on the inner former as a spiral the windings of which lie between the windings of the plain or coiled heating element thereon. The earth wire thus supports an insulating barrier between the windings of the heating element and also provides an easy path to earth at any point of breakdown.

The invention will now be described with reference to the accompanying drawings, but the invention is not limited to the particular embodiments shown.

Figure 1 shows the elementary form of assembly in which $a$ is a closed end outer tube, $b$ an inner former tube, $c$ are element leads, $e$ element spirals or helices, $f$ insulating refractory beads threaded upon an independent wire $g$ to form an earth or ground wire, while $h$ is suitable cement applied to maintain even spacing of spirals $e$. Binding wires $k$ are applied at each end of the element spiral to prevent movement.

In Figure 2 a single wire element is wound on spirals $e$ having connecting leads $c$, the spirals $e$ being interspaced by insulating beads $f$ threaded upon an earth or ground wire $g$ all mounted upon an inner former tube $b$ encased in an outer tube $a$. Binding wires $k$ are provided at each end of the lement spiral and a refractory tube $m$ is inserted to insulate the element lead $c$ from the earth wire $g$ one end of which terminates at the bottom of the heater.

In Figure 3 inner former $b$ may be either a solid rod or a tube and element leads $c$ and earth lead $g$ are returned to the connecting end of the outer surface of the former $b$, being insulated from each other by means of refractory tubes $m$. The element $e$ is wound as a double-start helix. The construction is otherwise similar to Figure 2.

Figure 4 shows an arrangement suitable for multi-phase wiring in which three separate heating elements $e$ are star-connected and interspacing beads $f$ and element coils $e$ are coiled as three-start spirals or helices. Binding wires $k$ and insulating tubes $m$ are fitted as in Figures 2 and 3. Multiple elements of similar or varied rating may be substituted for the triple elements $e$.

In Figures 5 and 6, grooved formers $r$ are shown. Referring to Figure 5, a separate groove $p$ is spaced between the windings of element $o$ to isolate the ground, or earth wire $g$ from element coils $e$.

In Figure 6 the ground or earth wire $g$ is inside element coil $e$ from which it is insulated by beads $f$ which may also form a support to prevent collapse of the element spiral such as occurs when small diameter element wire is wound into a relatively large diameter coil. This arrangement may be used with the plain inner former $b$ of Figure 1 as well as with the grooved former $r$ of Figure 6. It will be appreciated that assembly or dismantling for repairs can be executed simply and economically whilst at all times in use, the earth wire provides protection not previously supplied in immersion heaters of this kind.

The invention provides a convenient means of ensuring an easy path to earth of electric current in the event of a breakdown of the external electrical insulation of the heater which would otherwise permit leakage of current into the liquid contents of a tank or vessel in which it is immersed. An earth lead thus provided is of special value where the tanks or vessels are themselves lined with insulating material or otherwise insulated from earth and the liquid contents are of a corrosive or active nature such as would quickly destroy an extraneous earth connection if applied. It is also of special value in tanks which may themselves be used as an earth return medium for a secondary electric current as in the case of some electro deposition and electro plating plants. As no metal is exposed by this method, metallic contamination of electrolyte or acid cannot possibly occur. An easy method of automatically breaking the supply of electric current in cases of failure of insulation or breakage of the outer sheath is thus available.

The use of refractory insulating beads as previously described provides a readily available means of insulating the special earth wire and also positively spacing the element coils at distances variable by the use of beads of the size desired, thus retaining in a cheap and simple form all the advantages of more expensive machined or moulded methods.

What I claim is:

1. An electric immersion heater for heating a fluid contained in a vessel, comprising, in combination, a tube having a closed end and consisting at least partly of a dielectric material; a former arranged in said tube; an electric resistance wire serving as heating element arranged in said tube and wound on said former; and an independent ground wire arranged in said tube in proximity of and spaced from said electric resistance wire so that upon penetration of said fluid into said tube said fluid establishes electric connection between said resistance wire and said ground wire so as to ground said resistance wire within said tube, thus preventing the passage of a dangerous current through the fluid contained in the vessel.

2. An electric immersion heater for heating fluid contained in a vessel, comprising, in combination, a tube having a closed end and consisting at least partly of a dielectric material; a former arranged in said tube; an electric resistance wire serving as heating element arranged in said tube and helically wound on said former, said former being provided with a helical groove arranged between the helical turns of said electric resistance wire; and an independent ground wire arranged in said helical groove of said former in proximity of and spaced from said electric resistance wire so that upon penetration of said fluid into said tube said fluid establishes electric connection between said resistance wire and said ground wire so as to ground said resistance wire within said tube thus preventing the passage of a dangerous current through the fluid and articles immersed within the fluid contained in the vessel.

3. An electric immersion heater for heating a fluid contained in a vessel, comprising, in combination, a tube having a closed end and consisting at least partly of a dielectric material; a former arranged in said tube; an electric resistance wire serving as heating element arranged in said tube and wound on said former; an independent ground wire arranged in said tube in proximity of and spaced from said electric resistance wire; and protective means arranged on said independent ground wire for preventing contact between said electric resistance wire and said independent ground wire in the absence of said fluid in said tube, and upon penetration of said fluid into said tube permitting electrical connection between said resistance wire and said ground wire, whereupon the passage of a dangerous current through the fluid contained within the vessel is prevented.

4. An electric immersion heater for heating fluid contained in a vessel, comprising, in combination, a tube having a closed end and consisting at least partly of a dielectric material; a former arranged in said tube; a coiled electric resistance wire wound in helical turns on said former; an independent ground wire wound in helical turns between and spaced from said helical turns of said coiled electric resistance wire; and a plurality of refractory insulating beads arranged on said independent ground wire for protecting said independent ground wire against corrosion, said means also preventing contact between said electric resistance wire and said independent ground wire in the absence of said fluid in said tube, and upon penetration of said fluid into said tube permitting electrical connection between said resistance wire and said ground wire, whereupon the passage of a dangerous current through the fluid contained within the vessel is prevented.

5. An electric immersion heater for heating a fluid contained in a vessel, comprising, in combination, a tube having a closed end and consisting at least partly of a dielectric material; a former arranged in said tube; an electric resistance wire serving as heating element arranged in said tube and wound on said former, said electric resistance wire having at least two lead connections adapted to be connected to a voltage source; and an independent ground wire having a free end arranged within said tube, an other end serving as a lead connection adapted to be connected to ground, and a main portion intermediate said ends and arranged in proximity of and spaced from said electric resistance wire so that upon penetration of said fluid into said tube said fluid establishes electric connection between said resistance wire and said ground wire so as to ground said resistance wire within said tube, thus preventing the passage of a dangerous current through the fluid contained in the vessel.

6. An electric immersion heater for heating a fluid contained in a vessel, comprising, in combination, a tube having a closed end and consisting at least partly of a dielectric material; a helically wound ground wire having a free end arranged within said tube and an other end serving as a lead connection adapted to be connected to ground; a fluid permeable electrically insulating, substantially tubular spacing member arranged on said ground wire; and an independent electric resistance wire coiled about said tubular spacing member, so that upon penetration of said fluid into said tube said fluid seeps through said fluid permeable tubular spacing member establishing electric connection between said resistance wire and said ground wire so as to ground said resistance wire within said tube, thus preventing the passage of a dangerous current through the fluid contained in the vessel.

7. An electric immersion heater for heating a fluid contained in a vessel, comprising, in combination, a tube having a closed end and consisting at least partly of a dielectric material; a former arranged in said tube; a helically wound ground wire having a free end arranged within said tube and an other end serving as a lead connection adapted to be connected to ground; a fluid permeable electrically insulating, substantially tubular spacing member arranged on said ground wire; and an independent electric resistance wire wound on said former and being coiled about said tubular spacing member, so that upon penetration of said fluid into said tube said fluid seeps through said fluid permeable tubular spacing member establishing electric connection between said resistance wire and said ground wire so as to ground said resistance wire within said tube, thus preventing the passage of a dangerous current through the fluid contained in the vessel.

8. An electric immersion heater for heating a fluid contained in a vessel, comprising, in combination, a tube having a closed end and consisting at least partly of a refractory dielectric material; a former arranged in said tube; an electric resistance wire serving as heating element arranged in said tube and wound on said former; and an independent ground wire arranged in said tube in proximity of and spaced from said electric resistance wire so that upon penetration of said fluid into said tube said fluid establishes electric connection between said resistance wire and said ground wire so as to ground said resistance wire within said tube, thus preventing the passage of a dangerous current through the fluid contained in the vessel.

9. An electric immersion heater for heating a fluid contained in a vessel, comprising, in combination, a tube having a closed end and consisting at least partly of a vitreous dielectric material; a former arranged in said tube; an electric resistance wire serving as heating element arranged in said tube and wound on said former; and an independent ground wire arranged in said tube in proximity of and spaced from said electric resistance wire so that upon penetration of said fluid into said tube said fluid establishes electric connection between said resistance wire and said ground wire so as to ground said resistance wire within said tube, thus preventing the passage of a dangerous current through the fluid contained in the vessel.

10. An electric immersion heater for heating a fluid contained in a vessel, comprising, in combination, a tube having a closed end and consisting at least partly of a synthetic plastic dielectric material; a former arranged in said tube; an electric resistance wire serving as heating element arranged in said tube and wound on said former; and an independent ground wire arranged in said tube in proximity of and spaced from said electric resistance wire so that upon penetration of said fluid into said tube said fluid establishes electric connection between said resistance wire and said ground wire so as to ground said resistance wire within said tube, thus preventing the passage of a dangerous current through the fluid contained in the vessel.

11. An electric immersion heater for heating fluid contained in a vessel, comprising, in combination, a tube having a closed end and consisting at least partly of a dielectric material; a former arranged in said tube; a coiled electric resistance wire wound in helical turns on said former; an independent ground wire wound in helical turns between and spaced from said helical turns of said coiled electric resistance wire, said coiled electric resistance wire and said independent ground wire being wound as double-start helices, respectively; and a plurality of refractory insulating beads arranged on said independent ground wire for protecting said independent ground wire against corrosion, said means also preventing contact between said electric resistance wire and said independent ground wire in the absence of said fluid in said tube, and upon penetration of said fluid into said tube permitting electrical connection between said resistance wire and said ground wire, whereupon the passage of a dangerous current through the fluid contained within the vessel is prevented.

12. An electric immersion heater for heating fluid contained in a vessel, comprising, in combination, a tube having a closed end and consisting at least partly of a dielectric material; a former arranged in said tube; a coiled electric resistance wire wound in helical turns on said former; an independent ground wire wound in helical turns on said former between and spaced from said helical turns of said coiled electric resistance wire, said coiled electric resistance wire and said independent ground wire being wound on said former as double-start helices, respectively; and a plurality of refractory insulating beads arranged on said independent ground wire for protecting said independent ground wire against corrosion, said means also preventing contact between said electric resistance wire and said independent ground wire in the absence of said fluid in said tube, and upon penetration of said fluid into said tube permitting electrical connection between said resistance wire and said ground wire, whereupon the passage of a dangerous current through the fluid contained within the vessel is prevented.

13. An electric immersion heater for heating fluid contained in a vessel, comprising, in combination, a tube having a closed end and consisting at least partly of a dielectric material; a former arranged in said tube; a coiled electric resistance wire wound in helical turns on said former; an independent ground wire wound in helical turns on said former between and spaced from said helical turns of said coiled electric resistance wire, said coiled electric resistance wire and said independent ground wire being wound on said former as three-start helices, respectively; and a plurality of refractory insulating beads arranged on said independent ground wire for protecting said independent ground wire against corrosion, said means also preventing contact between said electric resistance wire and said independent ground wire in the absence of said fluid in said tube, and upon penetration of said fluid into said tube permitting electrical connection between said resistance wire and said ground wire, whereupon the passage of a dangerous current through the fluid contained within the vessel is prevented.

14. An electric immersion heater for heating a fluid contained in a vessel comprising, in combination, a tube having a closed end and consisting at least partly of dielectric material; a former arranged in said tube; a plurality of electric resistance wires serving as heating elements arranged in said tube and wound on said former, said electric resistance wires having lead connections adapted to be connected to a voltage source; and a plurality of independent ground wires equal in number to the number of said electric resistance wires, each of said plurality of independent ground wires having a free end arranged within said tube, another end serving as lead connections adapted to be connected to ground, and a main portion intermediate said ends and arranged in proximity of and spaced from said electric resistance wires so that upon penetration of said fluid into said tube said fluid establishes electric connection between said resistance wire and said ground wire so as to ground said resistance wire within said tube, thus preventing the passage of a dangerous current through the fluid contained in the vesesl.

15. An electric immersion heater for heating a fluid contained in a vessel, comprising, in combination, a tube having a closed end and consisting at least partly of dielectric material; a former arranged in said tube; a plurality of electric resistance wires serving as heating elements arranged in said tubes and wound on said former, said electric resistance wires having lead connections adapted to be connected to a voltage source; and a plurality of independent ground wires equal in number to the number of said electric resistance wires, each of said plurality of independent ground wires having a free end arranged within said tube, another end serving as lead connections adapted to be connected to ground, and a main portion intermediate said ends being arranged alternately between and spaced from respective electric resistance wires so as to ground said resistance wires upon penetration of said fluid into said tube, thus preventing the passage of a dangerous current through the fluid contained in the vessel.

16. An electric immersion heater for heating a fluid contained in a vessel, comprising, in combination, a tube having a closed end and consisting at least partly of dielectric material; a former arranged in said tube; a plurality of electric resistance wires serving as heating elements arranged in said tube and wound on said former, said electric resistance wires having lead connections adapted to be connected to a voltage source; and a plurality of independent ground wires equal in number to the number of said electric resistance wires, each of said plurality of independent ground wires having a free end arranged within said tube, another end serving as lead connections adapted to be connected to ground, and a main portion intermediate said ends, said main portions of each of said plurality of independent ground wires being arranged between and spaced from respective resistance wires, so as to ground said resistance wires upon penetration of said fluid into said tube, thus preventing the passage of a dangerous current through the fluid contained in the vessel.

ROBERT IRVING.

References Cited in the file of this patent

UNITED STATES PATENTS

| Number | Name | Date |
| --- | --- | --- |
| 1,365,978 | Gallager | Jan. 18, 1921 |
| 1,459,307 | Laise et al. | June 19, 1923 |
| 1,472,197 | Sutherland | Oct. 30, 1923 |
| 1,809,089 | Wiegand | June 9, 1931 |
| 1,922,029 | Chesnut | Aug. 15, 1933 |
| 1,952,445 | Ludwig | Mar. 27, 1934 |
| 2,088,586 | Cole et al. | Aug. 3, 1937 |
| 2,549,211 | Lamm | Apr. 17, 1951 |

FOREIGN PATENTS

| Number | Country | Date |
| --- | --- | --- |
| 569,062 | Germany | Nov. 2, 1929 |